(No Model.)

W. G. TILTON.
SHAFT COUPLING.

No. 502,686. Patented Aug. 1, 1893.

Witnesses
Fred A. Mason
C. O. Mason

Inventor
Wheelock G. Tilton
by F. W. Mason
atty.

UNITED STATES PATENT OFFICE.

WHEELOCK G. TILTON, OF NEW BEDFORD, MASSACHUSETTS, ASSIGNOR OF ONE-HALF TO OLIVER H. GARDNER, OF SAME PLACE.

SHAFT-COUPLING.

SPECIFICATION forming part of Letters Patent No. 502,686, dated August 1, 1893.

Application filed March 6, 1893. Serial No. 464,915. (No model.)

*To all whom it may concern:*

Be it known that I, WHEELOCK G. TILTON, a citizen of the United States, residing at New Bedford, in the county of Bristol and State of Massachusetts, have invented certain new and useful Improvements in Shaft-Couplings, of which the following is a specification.

The object of my invention is to provide means whereby two shafts coupled together, are prevented from drawing apart longitudinally.

To this end, my invention consists in providing the interior of a sleeve coupling, with annular grooves, corresponding with annular grooves made in the ends of the shafts; and an open spring ring adapted to fit in said grooves, when the shafts are coupled together.

Figure 1:
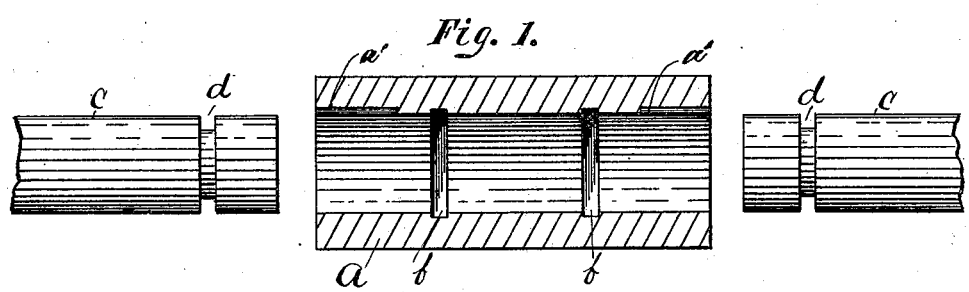
Figure 3:
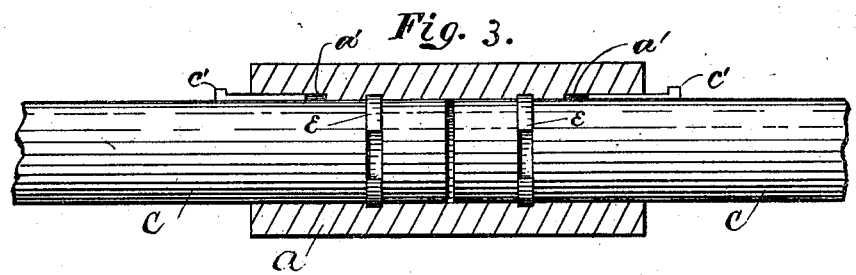
Figure 2:
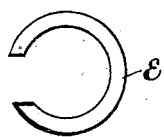

In the drawings, Figure 1. represents a view in longitudinal section, of a shaft coupling, and the contiguous ends of shafts, fitted in accordance with my improvement. Fig. 2. represents a view of the device which couples the shafts longitudinally. Fig. 3. represents a view of the shafts coupled together, and showing the sleeve of the coupling in longitudinal section.

Similar letters refer to similar parts in the several views.

$a$, represents a shaft coupling, having the annular grooves $b, b$, cut in its inside surface.

$c, c$, represent the ends of the shafts, provided with the annular grooves $d$.

$e$, represents an open spring ring, adapted to fit in said grooves. The grooves in the coupling $a$, are of a depth to take one half of the thickness of the open spring ring $e$. The grooves in the shafts, are of a depth, to take the whole of the thickness of the ring $e$, so that when the ring $e$, is compressed in the groove in the shaft, its outer surface will be flush with the surface of the shaft.

In coupling the shafts together, the rings $e$, are sprung into the grooves $d$, and compressed, so that their outer surfaces are flush with the surface of the shaft; and the shafts are then moved into the sleeve, until the grooves in the shafts coincide with the grooves in the sleeve; when, the rings spring outward into the grooves in the sleeve, which takes half of the thickness of said rings; the other half of the thickness of the rings, resting in the grooves in the shafts, and thus the shafts are locked in the sleeve and prevented from longitudinal motion. The shafts $c, c$, are prevented from turning in the sleeve $a$, by the ordinary means of keys $c'$, driven in key-ways $a'$.

I claim—

In combination with a shaft coupling having annular grooves in its inside surface; and corresponding grooves in the ends of the shafts to be coupled; an open spring ring, adapted to fit in each of said grooves when the coupling is adjusted and secured in place; as and for the purpose shown and described.

WHEELOCK G. TILTON.

Witnesses:
JAMES C. HITCH,
HENRY W. MASON.